United States Patent [19]

Schmidlin et al.

[11] Patent Number: 4,949,103

[45] Date of Patent: Aug. 14, 1990

[54] DIRECT ELECTROSTATIC PRINTING APPARATUS AND METHOD FOR MAKING LABELS

[75] Inventors: Fred W. Schmidlin, Pittsford; William A. Sullivan, Webster, both of N.Y.

[73] Assignee: Xerox Corporation, Stamford, Conn.

[21] Appl. No.: 393,122

[22] Filed: Aug. 28, 1989

[51] Int. Cl.[5] .......... G01D 15/00

[52] U.S. Cl. .......... 346/150; 346/159; 156/215

[58] Field of Search .......... 346/150, 159, 135.1, 346/153.1, 1.1; 156/215

[56] References Cited

U.S. PATENT DOCUMENTS

| | | | |
|---|---|---|---|
| 3,689,935 | 9/1972 | Pressman et al. | 346/74 ES |
| 3,778,678 | 12/1973 | Masuda | 317/3 |
| 3,801,869 | 4/1974 | Masuda | 317/3 |
| 3,872,361 | 3/1975 | Masuda | 317/262 E |
| 4,272,311 | 6/1981 | D'Angelo | 156/215 |
| 4,491,855 | 1/1985 | Fujii et al. | 346/159 |
| 4,515,882 | 5/1985 | Mammins et al. | 430/58 |
| 4,568,955 | 2/1986 | Zlosoga et al. | 346/153.1 |
| 4,647,179 | 3/1987 | Schmidlin | 355/300 |
| 4,743,926 | 5/1988 | Schnidlin et al. | 346/159 |
| 4,755,837 | 7/1988 | Schmidlin et al. | 346/155 |
| 4,780,733 | 10/1988 | Schmidlin | 346/160.1 |
| 4,814,796 | 3/1989 | Schmidlin | 346/155 |

*Primary Examiner*—Arthur G. Evans

[57] ABSTRACT

A direct electrostatic printing (DEP) device is utilized for printing wrong reading images on a transparent substrate. An adhesive coating on the transparent substrate precludes toner bounce during printing and enables the transparent substrate to be affixed to a substrate such as an envelope such that the wrong reading images are right reading.

5 Claims, 2 Drawing Sheets

DIRECT ELECTROSTATIC PRINTING APPARATUS AND METHOD FOR MAKING LABELS

BACKGROUND OF THE INVENTION

This invention relates to direct electrostatic printing devices and more particularly to such a device capable of forming high resolution images.

Of the various electrostatic printing techniques, the most familiar and widely utilized is that of xerography wherein latent electrostatic images formed on a charge retentive surface are developed by a suitable toner material to render the images visible, the images being subsequently transferred to plain paper.

A lesser known and utilized form of electrostatic printing is one that has come to be known as direct electrostatic printing (DEP). This form of printing differs from the aforementioned xerographic form, in that, the toner or developing material is deposited directly onto a plain (i.e. not specially treated) substrate in image configuration. This type of printing device is disclosed in U.S. Pat. No. 3,689,935 issued Sept. 5, 1972 to Gerald L. Pressman et. al.

Pressman et al disclose an electrostatic line printer incorporating a multilayered particle modulator or printhead comprising a layer of insulating material, a continuous layer of conducting material on one side of the insulating layer and a segmented layer of conducting material on the other side of the insulating layer. At least one row of apertures is formed through the multilayered particle modulator. Each segment of the segmented layer of the conductive material is formed around a portion of an aperture and is insulatively isolated from every other segment of the segmented conductive layer. Selected potentials are applied to each of the segments of the segmented conductive layer while a fixed potential is applied to the continuous conductive layer. An overall applied field projects charged particles through the row of apertures of the particle modulator and the density of the particle stream is modulated according to the pattern of potentials applied to the segments of the segmented conductive layer. The modulated stream of charged particles impinge upon a print-receiving medium interposed in the modulated particle stream and translated relative to the particle modulator to provide line-by-line scan printng. In the Pressman et. al. device the supply of the toner to the control member is not uniformly effected and irregularities are liable to occur in the image on the image receivng member. High-speed recording is difficult and moreover, the openings in the printhead are liable to be clogged by the toner.

U.S. Pat. No. 4,491,855 issued on Jan. 1, 1985 in the name of Fujii et. al. discloses a method and apparatus utilizing a controller having a plurality of openings or slit-like openings to control the passage of charged particles and to record a visible image by the charged particles directly on an image receiving member. Specifically disclosed therein is an improved device for supplying the charged particles to a control electrode that has allegedly made high-speed and stable recording possible. The improvement in Fujii et. al. lies in that the changed particles supported on a supporting member and an alternating electric field is applied between the supporting member and the control electrode. Fujii et. al. purports to obviate the problems noted above with respect to Pressman et. al. Thus, Fujii et. al. alleges that their device makes it possible to sufficiently supply the charged particles to the control electrode without scattering them.

U.S. Pat. No. 4,568,955 issued on Feb. 4, 1986 to Hosoya et. al. discloses a recording apparatus wherein a visible image based on image information is formed on an ordinary sheet by a developer. The recording apparatus comprises a developing roller spaced at a predetermined distance from and facing the ordinary sheet and carrying the developer thereon. It further comprises a recording electrode and a signal source connected thereto for propelling the developer on the developing roller to the ordinary sheet by generating an electric field between the ordinary sheet and the developing roller according to the image information. A plurality of mutually insulated electrodes are provided on the developing roller and extend therefrom in one direction. An A.C. and a D.C. source are connected to the electrodes, for generating an alternating electric field between adjacent ones of the electrodes to cause oscillations of the developer found between the adjacent electrodes along electric lines of force therebetween to thereby liberate the developer from the developing roller. In a modified form of the Hosoya et. al. device, a toner reservoir is disposed beneath a recording electrode which has a top provided with an opening facing the recording electrode and an inclined bottom for holding a quantity of toner. In the toner reservoir are disposed a toner carrying plate as the developer carrying member, secured in a position such that it faces the end of the recording electrode at a predetermined distance therefrom and a toner agitator for agitating the toner.

U.S. Pat. No. 4,647,179 granted to Fred W. Schmidlin on Mar. 3, 1987 discloses a toner transporting apparatus for use in forming powder images on an imaging surface. The apparatus is characterized by the provision of a travelling electrostatic wave conveyor for the toner particles for transporting them from a toner supply to an imaging surface. The conveyor comprises a linear electrode array consisting of spaced apart electrodes to which a multiphase a.c. voltage is connected such that adjacent electrodes have phase shifted voltages applied thereto which cooperate to form the travelling wave.

U.S. Pat. No. 3,872,361 issued to Masuda discloses an apparatus in which the flow of particulate material along a defined path is controlled electrodynamically by means of elongated electrodes curved concentrically to a path, as axially spaced rings or interwound spirals. Each electrode is axially spaced from its neighbors by a distance about equal to its diameter and is connected with one termnal of a multi-phase alternating high voltage source. Adjacent electrodes along the path are connected with different terminals in a regular sequence, producing a wave-like, non-uniform electric field that repels electrically charged particles axially inwardly and tends to propel them along the path.

U.S. Pat. No. 3,778,678 also issued to Masuda relates to a similar device as that disclosed in the aforementioned '367 patent.

U.S. Pat. No. 3,801,869 issued to Masuda discloses a booth in which electrically charged particulate material is sprayed onto a workpiece having an opposite charge, so that the particles are electrostatically attracted to the workpiece. All of the walls that confront the workpiece are made of electrically insulating material. A grid-like arrangement of parallel, spaced apart electrodes, insulated from each other extends across the entire area of every wall, parallel to a surface of the wall and in intimate juxtaposition thereto. Each electrode is connected with one terminal of an alternating high voltage source, every electrode with a different terminal than each of the electrodes laterally adjacent to it, to produce a constantly varying field that electrodynamically repels particles from the wall. While the primary purpose of the device disclosed is for powder painting, it is contended therein that it can be used for electrostatic or electrodynamic printing.

The Masuda devices all utilize a relatively high voltage source (i.e. 5-10 KV) operated at a relatively low frequency, i.e. 50 Hz, for generating his travelling waves. In a confined area such as a tube or between parallel plates the use of high voltages is tolerable and in the case of the '869 patent even necessary since a high voltage is required to charge the initially uncharged particles.

In U.S. Pat. Application Ser. No. 374,376, now abandoned and its foreign counterpart filed in Japan on May 7, 1981 there is disclosed a device comprising an elongated conduit which utilizes travelling waves for transporting toner from a supply bottle to a toner hopper.

U.S. Pat. No. 4,743,926 granted on May 10, 1988 to Schmidlin et. al. and assigned to the same assignee as the instant invention discloses an electrostatic printing apparatus including structure for delivering developer or toner particles to a printhead forming an integral part of the printing device. Alternatively, the toner particles can be delivered to a charge retentive surface containing latent images. The developer or toner delivery system is adapted to deliver toner containing a minimum quantity of wrong sign and size toner. To this end, the developer delivery system includes a pair of charged toner conveyors which are supported in face-to-face relation. A bias voltage is applied across the two conveyors to cause toner of one charge polarity to be attracted to one of the conveyors while toner of the opposite is attracted to the other conveyor. One of charged toner conveyors delivers toner of the desired polarity to an apertured printhead where the toner is attracted to various apertures thereof from the conveyor.

In another embodiment of the '926 patent, a single charged toner conveyor is supplied by a pair of three-phase generators which are biased by a dc source which causes toner of one polarity to travel in one direction on the electrode array while toner of the opposite polarity travels generally in the opposite direction.

In an additional embodiment disclosed in the '926 patent, a toner charging device is provided which charges uncharged toner particles to a level sufficient for movement by one or the other of the aforementioned charged toner conveyors.

The toner in a device such as disclosed in the '926 patent is extracted from the "tops" of the clouds via the fringe fields that extend into the clouds from around the apertures. The efficiency of toner usage in a charged toner conveyor of the type disclosed in the '937 application is currently limited by the relatively dilute toner density in the "tips" of the toner clouds that are transported thereby.

U.S. Pat. No. 4,814,796 granted on Mar. 21, 1989 to Fred W. Schmidlin and assigned to the same assignee as the instant invention discloses a direct electrostatic printing apparatus including structure for delivering developer or toner particles to a printhead forming an integral part of the printing device. The printing device includes, in addition to the printhead, a conductive shoe which is suitably biased during a printing cycle to assist in the electrostatic attraction of developer through apertures in the printhead onto the copying medium disposed intermediate the printhead and the conductive shoe. The structure for delivering developer or toner is adapted to deliver toner containing a minimum quantity of wrong sign and size toner. To this end, the developer delivery system includes a conventional magnetic brush which delivers toner to a donor roll structure which, in turn, delivers toner to the vicinity of apertures in the printhead structure.

U.S. Pat. No. 4,780,733 granted on Oct. 25, 1988 to Fred W. Schmidlin and assigned to the same assignee as the instant invention discloses a direct electrostatic printing apparatus including structure for delivering developer or toner particles to a printhead forming an integral part of the printing device. The printing device includes, in addition to an aperatured printhead, a conductive shoe which is suitably biased during a printing cycle to assist in the electrostatic attraction of developer through apertures in the printhead onto the copying medium disposed intermediate the printhead and the conductive shoe. Developer or toner is delivered to the printhead via a pair of opposed charged toner or developer conveyors. One of the conveyors is attached to the printhead and has an opening therethrough for permitting passage of the developer or toner from between the conveyors to areas adjacent the apertures in the printhead.

U.S. Pat. No. 4,755,837 granted on Jul. 5, 1988 to Fred W. Schmidlin and assigned to the same assignee as the instant invention discloses a direct electrostatic printing apparatus including structure for removing wrong sign developer particles from a printhead forming an integral part of the printing device. The printing device includes, in addition to the printhead, a conductive shoe which is suitably biased during a printing cycle to assist in the electrostatic attraction of developer passing through apertures in the printhead onto the copying medium disposed intermediate the printhead and the conductive shoe. During a cleaning cycle, the printing bias is removed from the show and an electrical bias suitable for creating an oscillating electrostatic field which effects removal of toner from the printhead is applied to the shoe. The toner particles so removed are attracted to the copy medium in areas away form the image areas.

In prior art direct electrostatic printing devices, some of the toner bounces off the image receiver or imaging member and attaches to the receiver at unintended locations. It can be observed with a magnifying eyepiece, that the aforementioned toner is scattered around the edges of the images and in a severe case some loss of image sharpness is visible to the unaided eye.

BRIEF SUMMARY OF THE INVENTION

The present invention is directed to a direct electrostatic printing (DEP) apparatus comprising a supply of charged toner disposed adjacent one side of an apertured printhead structure and an image receiving member disposed adjacent the other side thereof.

The image receiving member comprises a transparent substrate having an adhesive material coated on one side thereof. Toner is propelled in wrong or reverse reading image configuration through the apertures of the printhead and is adhered to the image receiving member by the adhesive material carried thereon. The adhesive material eliminates the toner bounce associated with prior art DEP devices.

The transparent member having the wrong reading toner images thereon can be used as an address label or for some sort of personal identification device. The adhesive side of the transparent member carrying the image is affixed to a suitable substrate such as a mailing envelope or an identification badge. In the case of the former, the imaging member could contain an address and/or name and in the case of the latter, it could contain a picture and/or a person's name.

An advantage of the present invention over other direct electrostatic imaging devices is that no fuser is required.

DETAILED DESCRIPTION OF THE DRAWINGS

Figure 1:
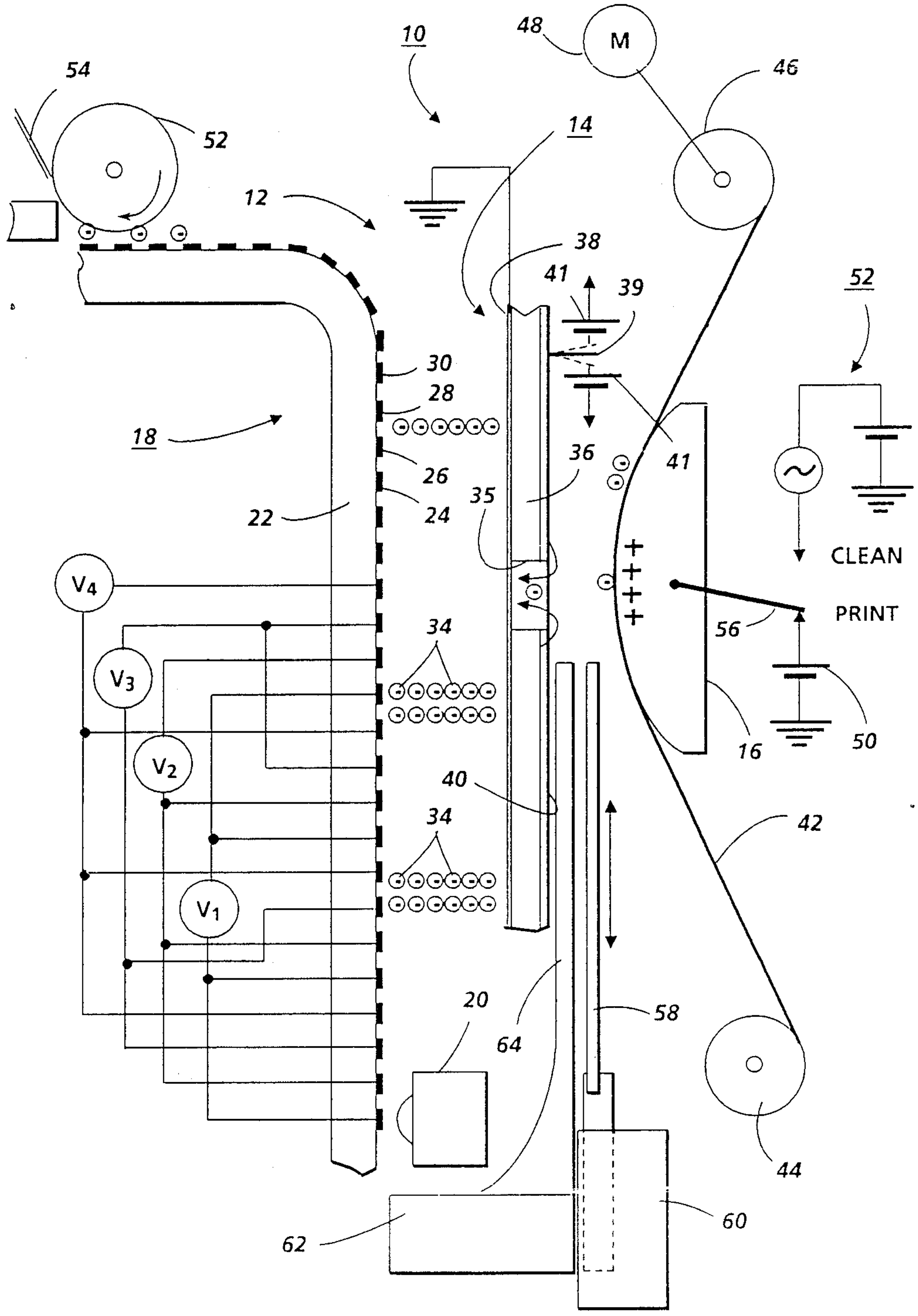
Figure 2:
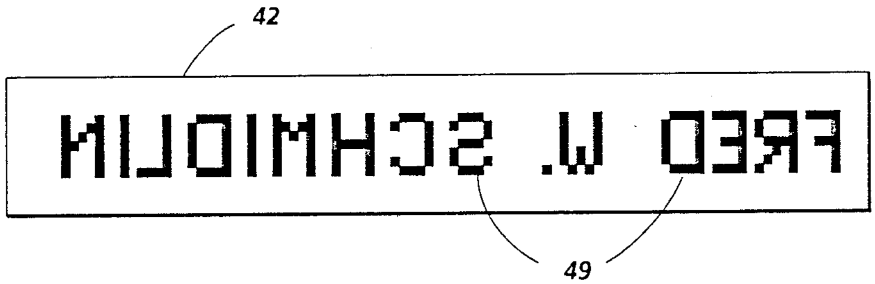

FIG. 1 is a schematic illustration of a direct electrostatic printing apparatus incorporating the invention; and FIG. 2 is a substrate illustrating a wrong reading image in accordance with the present invention.

DESCRIPTION OF THE PREFERRED EMBODIMENT OF THE INVENTION

Disclosed in the FIG. is an embodiment of a direct electrostatic printing apparatus 10 representing the invention.

The printing apparatus 10 includes a developer delivery or conveying system generally indicated by reference character 12, a printhead structure 14 and a backing electrode or show 16.

The developer delivery system 12 includes a charged toner conveyor (CTC) 18 and a magnetic brush developer supply 20. The charged toner conveyor 18 comprises a base member 22 and an electrode array comprising repeating sets of electrodes 24, 26, 28, and 30, to which are connected A.C. voltage sources $V_1$, $V_2$, $V_3$, and $V_4$ which voltage sources are phase shifted one from the other so that an electrostatic travelling wave pattern is established.

The effect of the travelling wave pattern established by the conveyor 18 is to cause already charged toner particles 34 delivered to the conveyor via the developer supply 20 to travel along the CTC to an area opposite the printhead apertures 35 (only one shown) where they come under the influence of electrostatic fringe fields emanating from the printhead 14 and ultimately under the influence of the field created by the voltage applied to the shoe 16. To enhance the interaction between the fringe fields and the toner travelling on the CTC the distance between the CTC and the printhead should be less than three wavelengths, or 12 electrode spacings on the CTC for a four phase CTC, and preferably less than one wavelength. A narrow CTC/printhead spacing facilitates a high delivery rate of useable toner and therefore a high printing speed.

By way of example, the developer comprises any suitable insulative non-magnetic toner/carrier combination having Aerosil (Trademark of Degussa, Inc.) contained therein in an amount approximately equal to 0.3 to 0.5% by weight and also having zinc stearate contained therein in an amount approximately equal to 0.1 to 1.0% by weight. It should be appreciatd however that the optimal amount of additives (Aerosil and zinc stearate) will vary depending on the base toner material, coating material on the CTC and the toner supply device.

The printhead structure 14 comprises a layered member including an electrically insulative base member 36 fabricated from a polyimide film having a thickness in the order of 1 to 2 mils (0.025 0.50 mm). The base member is clad on the one side thereof with a continuous conductive layer of shield 38 of aluminum which is approximately 1 micron (0.007 mm thick). The opposite side of the base member 36 carries segmented conductive layer 40 thereon which is fabricated from aluminum and has a thickness similar to that of the shield 38. The total thickness of the printhead structure is in the order of 0.001 to 0.002 inch (0.027 to 0.52 mm).

A plurality of holes or apertures 35 (only one of which is shown) approximately 0.15 mm in diameter are provided in the layered stucture in a pattern suitable for use in recording information. The apertures form an electrode array of individually addressable electrodes. With the shield 38 grounded and with 0–100 volts applied to an addressable electrode, toner is propelled through the aperture associated with that electrode. The aperture extends through the base 36 and the conductive layers 38 and 40.

With a negative 350 volts applied to an addressable electrode 40 via switch 39 and a dc power source 41 toner is prevented from being propelled through the aperture 35. Image intensity can be varied by adjusting the voltage on the control electrodes between 0 and minus 350 volts. Addressing of the individual electrodes can be effected in any well known manner known in the art of printing using electronically addressable printing elements.

The electrode or shoe 16 has an arcuate shape as shown but as will be appreciated, the present invention is not limited by such a configuration. The shoe which is positioned on the opposite side of an elongated web of recording medium 42 from the printhead 14 supports the recording medium in an arcuate path in order to provide an extended area of contact between the medium and the shoe.

The recording medium 42, in the preferred embodiment of the invention, comprises a transparent base member having one side thereof coated with an adhesive material. It is spaced from the printhead 14 a distance in the order of 0.002 to 0.030 inch as it passes thereby. The recording medium 42 is unwound from a supply roller 44 and is moved past the printhead apertures via a take-up roller rotatingly driven by a motor 48. The recording medium can be wound onto the take-up roller 46 and be stored for future use. Alternatively, a portion of the recording medium containing images can be immediately removed and affixed to a suitable substrate such as an envelope or an identification badge. Scotch brand adhesive tape is used for the recording medium 42. Alternatively, a transparent tape with permanent adhesive and a release liner could be used. The release liner could be removed during image formation and then replaced thereafter so that a roll of labels could be formed.

Characters depicted by reference characters 49 (see FIG. 2) as well as other types of images are printed on the transparent recording medium 42 in wrong or reverse reading order so that when viewed through the opposite side the information is right reading. For illustrating purposes the character images 49 are shown as pixel character images. However, the printing apparatus of the present invention forms near letter quality (NLQ) images.

During printing the shoe 16 is electrically biased to a dc potential of approximately 400 volts via a dc voltage source 50. Toner on the CTC not passed through the printhead is removed from the CTC downstream with an electrostatic pickoff device comprising a biased roll 52 and scraper blade 54. A vacuum pickoff device can be used in lieu of the electrostatic one.

Due to wrong sign toner becoming agglomerated on electrodes 40 of the printhead 14, a switch 56 is periodically actuated such that a dc biasd AC power supply 58 is connected to the shoe 16 to effect cleaning of the printhead. The voltage from the source 50 is supplied at a frequency which causes toner travelling through the apertures 35 into the gap between the paper and the printhead to oscillate and bombard the printhead.

Momentum transfer between the oscillating toner and any accumulated toner on the control electrodes 40 of the printhead causes the toner on the control electrodes to become dislodged. In order to prevent this dislodged toner from being deposited on the recording medium 42, a shutter 58 is moved from its inactivated position shown in the FIG. to its activated position (not shown). Movement of the shutter between its active and inactive positions is effected by means of a solenoid 60. In its activated position the shutter 58 blocks the dislodged toner therby precluding contact thereof with the recording medium 42. A combination vacuum source and storage container 62 serves a draw the toner through a conduit 64 after it is dislodged from electrodes 40 of the printhead structure 14.

A typical width for each of the electrodes for the travelling wave grid is 1 to 4 mils (0.025 to 0.10 mm). Typical spacing between the centers of the electrodes is twice the electrode width and the spacing between adjacent electrodes is approximately the same as the electrode width. Typical operating frequency is between 1000 and 10,000 Hz for 125 lpi grids 4 mil (0.10 mm) electrodes, the drive frequency for maximum transport rate being 2,000 Hz.

A typical operating voltage is relatively low (i.e. less than the Paschen breadkdown value) and is in the range of 30 to 1000 depending on grid size, a typical value being approximately 500 V for a 125 lpi grid. Stated differently, the desired operating voltage is approximately equal to 100 times the spacing between centers of adjacent electrodes.

While the electrodes may be exposed metal such as Cu or Al it is preferred that they be covered or overcoated with a thin oxide or insulator layer. A thin coating having a thickness of about half of the electrode width will sufficientl attenuate the higher harmonic frequencies and suppress attraction to the electrode edges by polarization forces. A slightly conductive over-coating will allow for the relaxation of charge accumulation due to charge exchange with the toner. To avoid excessive alteration of the toner charge as it moves about the conveyor, however, a thin coating of a material which is non-tribo active with respect to the toner is desireable. A weakly tribo-active material which maintains the desired charge level may also be utilized.

A preferred overcoating layer comprises a strongly injecting active matrix such as the disclosed in U.S. Pat. No. 4,515,882 granted in the name of Joseph Mammino et. al. on or about May 7, 1985 and assigned to the same assignee as the instant application. As disclosed therein, the layer comprises an insulting film forming continuous phase comprising charge transport molecules and finely divided charge injection enabling particles dispersed in the continous phase. A polyvinylfluoride film available from the E.I. duPont de Nemours and Company under the tradename Tedlar has also been found to be suitable for use as the overcoat.

What is claimed is:

1. Printing apparatus, said apparatus comprising:
   - a supply of marking particles;
   - a transparent substrate having an adhesive coating on one side thereof; and
   - means for applying marking particles in wrong reading image configuration on said side of said transparent substrate having said adhesive coating thereon.

2. A method of forming images in image configuration on a substrate, said method including the steps of:
   - providng a transparent substrate having an adhesive coating on one side thereof; and
   - printing wrong reading images on the side of said transparent substrate containing said adhesive coating.

3. The method according to claim 2 wherein said step of printing wrong reading images is accomplished utilizing direct electrostatic printing.

4. Apparatus according to claim 1 wherein said marking particles comprise toner particles.

5. Apparatus according to claim 4 wherein said printing apparatus comprises a direct electrostatic printing device.

* * * * *